(12) United States Patent
Murai et al.

(10) Patent No.: US 8,498,748 B2
(45) Date of Patent: Jul. 30, 2013

(54) AIR CONDITIONING CONTROL SYSTEM

(75) Inventors: Masahiko Murai, Tokyo (JP);
Nobutaka Nishimura, Tokyo (JP);
Koichi Ikeda, Kanagawa-ken (JP);
Tomonori Maegawa, Tokyo (JP);
Kenichi Yamazaki, Saitama-ken (JP);
Yoshikazu Ooba, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 128 days.

(21) Appl. No.: 13/035,489

(22) Filed: Feb. 25, 2011

(65) Prior Publication Data

US 2011/0210178 A1    Sep. 1, 2011

(30) Foreign Application Priority Data

Feb. 26, 2010    (JP) ................. P2010-042961

(51) Int. Cl.
*G05B 13/00* (2006.01)
(52) U.S. Cl.
USPC ............................. 700/276; 705/412; 340/506
(58) Field of Classification Search
USPC ............................. 700/276; 705/412; 340/506
See application file for complete search history.

(56) References Cited

U.S. PATENT DOCUMENTS

| 7,757,504 | B2 | 7/2010 | Yonezawa et al. | |
|---|---|---|---|---|
| 2004/0210348 | A1* | 10/2004 | Imhof et al. | 700/275 |
| 2007/0100479 | A1* | 5/2007 | Ahmed | 700/47 |
| 2008/0234869 | A1 | 9/2008 | Yonezawa et al. | |
| 2009/0132091 | A1* | 5/2009 | Chambers et al. | 700/276 |
| 2010/0006662 | A1 | 1/2010 | Yonezawa et al. | |
| 2010/0023167 | A1 | 1/2010 | Ito et al. | |

FOREIGN PATENT DOCUMENTS

| CN | 101344779 A | 1/2009 |
|---|---|---|
| JP | 61-49957 | 3/1986 |
| JP | 05-126380 | 5/1993 |
| JP | 6-221642 | 8/1994 |
| JP | 2003-83589 | 3/2003 |
| JP | 2004-325027 | 11/2004 |
| JP | 2006-170559 | 6/2006 |

(Continued)

OTHER PUBLICATIONS

Notification of Reasons for Refusal issued by the Japanese Patent Office on Aug. 10, 2012, for Japanese Patent Application No. 2010-042961, and English-language translation thereof.

(Continued)

*Primary Examiner* — Mohammad Ali
*Assistant Examiner* — Anthony Whittington
(74) *Attorney, Agent, or Firm* — Finnegan, Henderson, Farabow, Garrett & Dunner, L.L.P.

(57) ABSTRACT

According to an embodiment, provided is an air conditioning control system having a remote controller which collectively controls air conditioning facilities respectively provided in multiple buildings through a network. A building monitoring and controlling device is provided in each of the buildings. The building monitoring and controlling device monitors an air conditioning facility in a building where the building monitoring and controlling device itself is installed, and transmits operation data on the air conditioning facility to the remote controller. The remote controller calculates each operation setting value based on each set of operation data, and transmits the calculated operation setting value to the building monitoring and controlling device corresponding to the calculated operation setting value. The building monitoring and controlling device which has received the operation setting value controls the air conditioning facility by transmitting the operation setting value to the air conditioning facility.

8 Claims, 2 Drawing Sheets

FOREIGN PATENT DOCUMENTS

| | | |
|---|---|---|
| JP | 2007-207258 | 8/2007 |
| JP | 2009-174825 | 8/2009 |
| JP | 2010-7947 | 1/2010 |
| JP | 2010-14291 | 1/2010 |
| KR | 10-2005-0094260 | 9/2005 |

OTHER PUBLICATIONS

Yonezawa et al.; "Air-Conditioning Control System", U.S. Appl. No. 12/864,680, filed Jul. 27, 2010.

Takagi et al.; "Device and Method for Humidity Estimation", U.S. Appl. No. 12/903,640, filed Oct. 13, 2010.

Notification of Reasons for Refusal issued by the Japanese Patent Office on Jan. 6, 2012, for Japanese Patent Application No. 2010-042961, and English-language translation thereof.

Notice of Preliminary Rejection issued by the Korean Intellectual Property Office on Nov. 8, 2012, for Korean Patent Application No. 10-2011-0013986, and English-language translation thereof.

Notification of the First Office Action issued by the State Intellectual Property Office of the People's Republic of China for Chinese Patent Application No. 201110048700.4, and English-language translation thereof.

* cited by examiner

AIR CONDITIONING CONTROL SYSTEM

CROSS-REFERENCE TO RELATED APPLICATION(S)

This application is based upon and claims the benefit of priority from the prior Japanese Patent Application No. 2010-042961, filed on Feb. 26, 2010, the entire contents of which are incorporated herein by reference.

FIELD

An embodiment described herein relates to an air conditioning control system which controls air conditioning in office buildings, department stores, residential buildings, and the like.

BACKGROUND

Nowadays, environmental load reduction is demanded. For example, $CO_2$ reduction and energy saving are demanded in the field of Facility Solution. It is known that approximately 50% of energy consumed in a building is occupied by energy spent by air conditioning facilities. Therefore, in the field of Facility Solution, an important issue is to reduce energy consumed by air conditioning facilities.

To solve this issue, an air conditioning control system using a comfort index PMV (Predicted Mean Vote) value has been devised. The comfort index PMV is an index standardized internationally as ISO-7730, and is calculated based on the following six parameters: four physical parameters—(1) temperature, (2) humidity, (3) radiation temperature, (4) air velocity, and two body parameters—(5) amount of clothing worn, (6) amount of activity (metabolic rate).

Such an air conditioning control system can prevent excessive cooling and heating using the calculated comfort index PMV. Accordingly, energy consumption of the air conditioning facilities is reduced.

Conventionally, control of cooling and heating in habitable rooms or offices is performed for each building. In addition, an air conditioning control system is installed in the same building where the air conditioning is controlled (refer to JP, PH05-126380A, for example).

DETAILED DESCRIPTION

An air conditioning control system according to an embodiment includes: a plurality of building monitoring and controlling devices respectively installed in a plurality of buildings; and a remote controller connected to the plurality of building monitoring and controlling devices through a communication network. The plurality of building monitoring and controlling devices respectively monitor and control a plurality of air conditioning facilities respectively installed in the plurality of buildings. The remote controller acquires operation data on the air conditioning facility from each of the plurality of building monitoring and controlling devices through the communication network. The remote controller calculates an operation setting value for each air conditioning facility based on the operation data. The remote controller transmits the operation setting value calculated for the air conditioning facility, through the communication network, to the building monitoring and controlling device monitoring and controlling the air conditioning facility corresponding to the calculated operation setting value.

Description will be given below of an embodiment with reference to the drawings.

Figure 1:
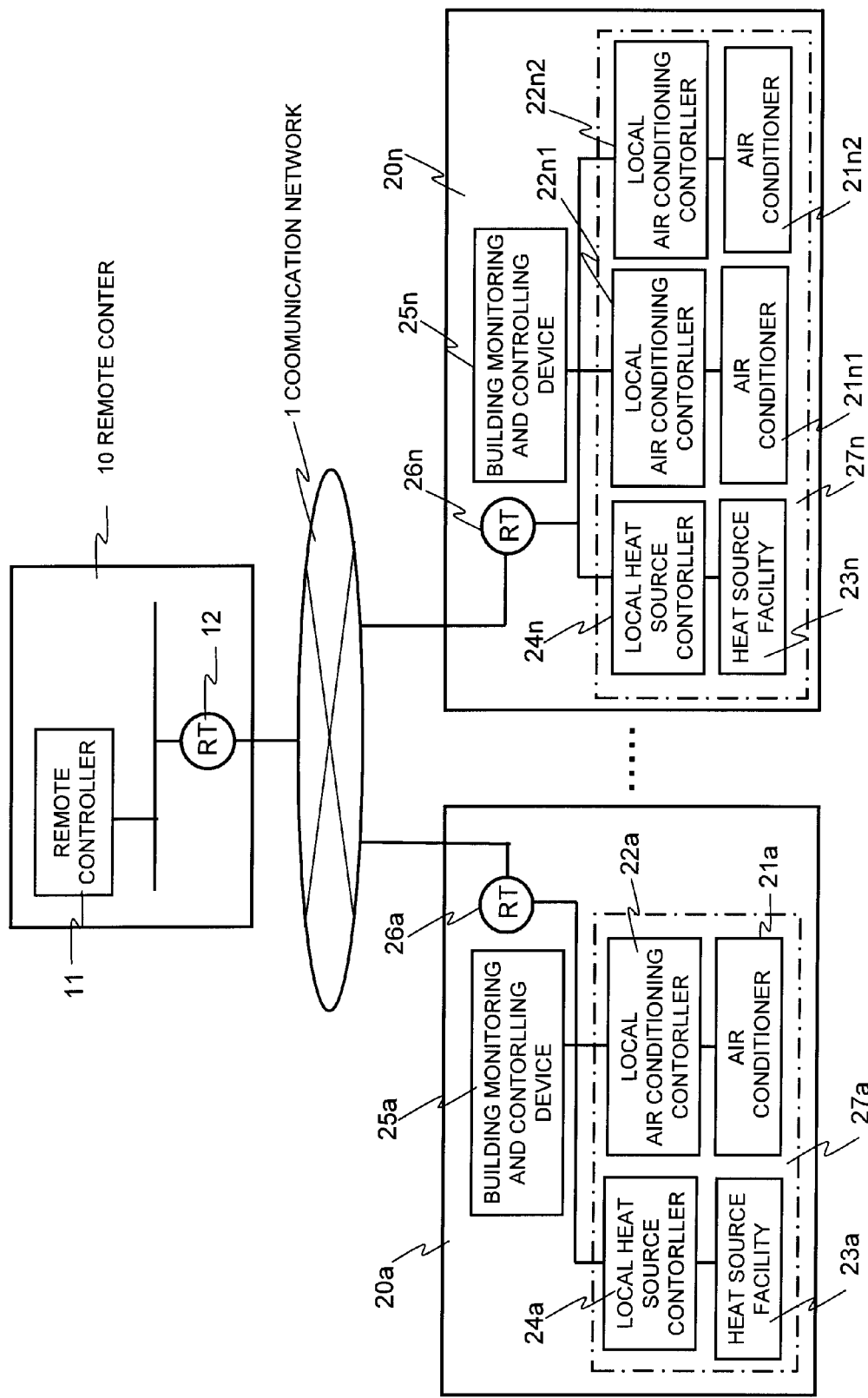
FIG. 1 is a diagram showing a configuration of an air conditioning control system according to an embodiment.

FIG. 1 is a block diagram showing a configuration of an air conditioning control system according to the embodiment.

As shown in FIG. 1, the air conditioning control system according to the embodiment includes a communication network 1, a remote center 10 connected to the communication network 1, and building monitoring and controlling devices respectively in buildings 20a, . . . , 20n.

The communication network 1 is formed by lines capable of communicating bi-directionally. Here, the communication network 1 is a network such as a LAN and an intranet. However, a different communication network may be used.

The remote center 10 is a management center including a remote controller 11 and a router 12. The remote controller 11 collectively manages air conditioning facilities 27a, . . . , 27n of the multiple buildings 20a, . . . , 20n through the building monitoring and controlling devices 25a, . . . , 25n.

The buildings 20a, . . . , 20n are respectively provided with the building monitoring and controlling devices 25a, . . . , 25n, the air conditioning facilities 27a, . . . , 27n, and the routers 26a, . . . , 26n. The air conditioning facilities 27a, . . . , 27n respectively include air conditioners 21a, . . . , 21n2, local air conditioning controllers 22a, . . . , 22n2, heat source facilities 23a, . . . , 23n, and local heat source controllers 24a, . . . , 24n. For example, the building 20a has the air conditioning facility 27a including the air conditioner 21a, the local air conditioning controller 22a, the heat source facility 23a, and the local heat source controller 24a. The building 20n has the air conditioning facility 27n including the air conditioners 21n1, 21n2, the local air conditioning controllers 22n1, 22n2, the heat source facility 23n, and the local heat source controller 24n. Each of the buildings 20a, . . . , 20n may have one set or multiple sets of the air conditioner and local air conditioning controller.

Components will be described below.

First, the components of the remote center 10 will be described.

The remote controller 11 collectively controls the air conditioning facilities 27a, . . . , 27n in the buildings 20a, . . . , 20n through the router 12. The remote controller 11 transmits operation setting values of the air conditioning facilities 27a, . . . , 27n respectively to the building monitoring and controlling devices 25a, . . . , 25n in the buildings 20a, . . . , 20n.

The remote controller 11 can calculate each operation setting value using an existing air conditioning control method. The remote controller 11 calculates the operation setting value for air conditioning control using a comfort index PMV value, for example.

To calculate the comfort index "PMV value," six parameters are needed, the six parameters being temperature, humidity, radiation temperature, air velocity, amount of clothing worn, amount of activity (metabolic rate). Among these, for the numerical values of air velocity, amount of clothing worn, amount of activity (metabolic rate), predetermined numerical values can be used. Note that, the numerical value used for amount of clothing worn may vary depending on a season and a place where the air conditioning facility is installed. The radiation temperature can be calculated from indoor temperature and outdoor temperature.

In the embodiment, the remote controller 11 periodically acquires the operation data on temperature and humidity for each of the buildings 20a, ..., 20n from the building monitoring and controlling devices 25a, ..., 25n through the network 1. Thus, the remote controller 11 calculates in real time the "PMV value" for each of the buildings 20a, ..., 20n.

Further, the remote controller 11 calculates temperature and humidity within the "PMV value" range of, for example, −0.5 to +0.5 recommended in ISO-7730 for each of the buildings 20a, ..., 20n. The calculated temperature and humidity is an operation set temperature and operation set humidity. Note that, if a target PMV value is variably set depending on a season, more energy saving effect can be achieved. For example, in summer, i.e., when cooling, the PMV value is set to +0.5, and in winter, i.e., when heating, the PMV value is set to −0.5.

The remote controller 11 transmits to each of the building monitoring and controlling devices 25a, ..., 25n an operation set temperature and operation set humidity corresponding to each of the building monitoring and controlling devices 25a, ..., 25n as the operation setting value through the network 1.

In the description above, the remote controller 11 calculates the operation setting value for each of the buildings 20a, ..., 20n. However, the remote controller 11 may calculate the operation setting value for each zone of the building or the operation setting value for each floor of the building. In this case, the remote controller 11 receives the operation data on each zone of the building or the operation data on each floor of the building from the corresponding one of the building monitoring and controlling devices 25a, ..., 25n.

The remote controller 11 calculates necessary conditions which minimize the energy consumption of the air conditioner and the heat source facility under restriction based on the "PMV value", if required. The examples of the conditions are a "supply air temperature" and a "heat-transfer-medium temperature." Then, the remote controller 11 transmits, as the operation setting value, the "supply air temperature" and the "heat-transfer-medium temperature" in addition to the operation set temperature and the operation set humidity to each of the building monitoring and controlling devices 25a, ..., 25n of the buildings 20a, ..., 20n. Note that the "supply air temperature" is temperature of air discharged from an air discharge of an air conditioner.

The router 12 connects between the remote controller 11 and the communication network 1. The router 12 relays communication between the building monitoring and controlling devices 25a, ..., 25n in the buildings 20a, ..., 20n and the remote controller 11.

Next, the components provided in the buildings 20a, ..., 20n will be described.

Each of the air conditioners 21a, ..., 21n2 has a heat exchanger which exchanges heat between a heat transfer medium and air. When cooling, each of the air conditioners 21a, ..., 21n2 blows air cooled by the heat transfer medium using a fan. When heating, each of the air conditioners 21a, ..., 21n2 blows air heated by the heat transfer medium from the blower. The heat transfer medium is water, for example. If multiple air conditioners are provided in one building, the air conditioners are provided to the floors or zones, respectively.

Each of the heat source facilities 23a, ..., 23n cools or heats the heat transfer medium. Examples of the heat source facilities 23a, ..., 23n are a refrigerator and a heat pump.

Unillustrated pipes are provided between the air conditioners 21a, ..., 21n2 and the heat source facilities 23a, ..., 23n, and the heat transfer medium circulates in the pipes. Each pipe has a pump to circulate the heat transfer medium. Thus, the heat transfer media cooled or heated by the heat source facilities 23a, ..., 23n are sent to the air conditioners 21a, ..., 21n2, and cool or heat air in the air conditioners 21a, ..., 21n2, and then return to the heat source facilities 23a, ..., 23n. The heat transfer media which have returned are cooled or heated again, and then sent to the air conditioners 21a, ..., 21n2.

The local air conditioning controllers 22a, ..., 22n2 control the air conditioners 21a, ..., 21n2. Each of the local air conditioning controllers 22a, ..., 22n2 periodically receives the operation set temperature and the operation set humidity from the corresponding one of the building monitoring and controlling devices 25a, ..., 25n. Each of the local air conditioning controllers 22a, 22n2 controls the power of the corresponding air conditioners 21a, ..., 21n2 so that a indoor temperature and a indoor humidity reach the operation set temperature and the operation set humidity. Each of the local air conditioning controllers 22a, ..., 22n2 adjusts the amount of air blown from the blower by adjusting the rotating speed of the fan, for example. Thus, the indoor temperature is adjusted. Moreover, dehumidification is performed by once lowering air temperature in the air conditioner so that the water vapor is condensed into dew and by then raising the air temperature.

In order to set the indoor temperature to 18° C. for example, each of the building monitoring and controlling devices 25a, ..., 25n inputs the set temperature of 18° C. to each corresponding one of the local air conditioning controllers 22a, ..., 22n2.

Moreover, each of the local air conditioning controllers 22a, 22n2 measures the indoor temperature, the indoor humidity and the outdoor temperature, and periodically transmits the measured temperatures and humidity as the operation data to the corresponding one of the building monitoring and controlling devices 25a, ..., 25n.

The local heat source controllers 24a, ..., 24n control the heat source facilities 23a, ..., 23n. Each of the local heat source controllers 24a, ..., 24n, as necessary, periodically receives the operation set temperature of the heat transfer medium (hereinafter, referred to as operation set heat-transfer-medium temperature). Each of the local heat source controllers 24a, ..., 24n controls the power of the corresponding one of the heat source facilities 23a, ..., 23n so that the heat-transfer-medium temperature reaches the operation set heat-transfer-medium temperature.

In order to set the heat-transfer-medium temperature to 7° C. for example, each of the building monitoring and controlling devices 25a, ..., 25n inputs the set heat-transfer-medium temperature of 7° C. to the corresponding one of the local heat source controllers 24a, ..., 24n. The heat transfer media cooled by the heat source facilities 23a, ..., 23n are used for cool air at the air conditioners 21a, ..., 21n2. The heat transfer media heated by the heat source facilities 23a, ..., 23n are used for warm air at the air conditioners 21a, ..., 21n2.

Each of the building monitoring and controlling devices 25a, ..., 25n receives the operation set temperature value, the operation set humidity value, and the like which are the operation setting value transmitted from the remote controller 11. Each of the building monitoring and controlling devices 25a, ..., 25n transmits the operation set temperature value, the operation set humidity value, and the like which have been received to a corresponding one of the local air conditioning controllers 22a, ..., 22n. In addition, each of the building monitoring and controlling devices 25a, ..., 25n receives an operation set heat-transfer-medium temperature value transmitted from the remote controller 11. Here, each of the building monitoring and controlling devices 25a, . . . , 25n transmits the received operation set heat-transfer-medium temperature value to the corresponding one of the local heat source controllers 24a, . . . , 24n.

In addition, the building monitoring and controlling devices 25a, . . . , 25n periodically collect the operation data on the air conditioners 21a, . . . , 21n2 from the local air conditioning controllers 22a, . . . , 22n2, respectively. Specifically, each of the building monitoring and controlling devices 25a, . . . , 25n receives the indoor temperature, the indoor humidity and the outdoor temperature periodically transmitted from the corresponding one of the local air conditioning controllers 22a, . . . , 22n2. Then each of the building monitoring and controlling devices 25a, . . . , 25n periodically transmits the received operation data to the remote controller 11 through the network 1.

Each of the routers 26a, . . . , 26n connects between the corresponding one of the building monitoring and controlling devices 25a, . . . , 25n and the communication network 1. Each of the routers 26a, . . . , 26n relays communication between the corresponding one of the building monitoring and controlling devices 25a, . . . , 25n and the remote controller 11.

Next, an operation of the embodiment will be described with reference to FIG. 2.

Figure 2:
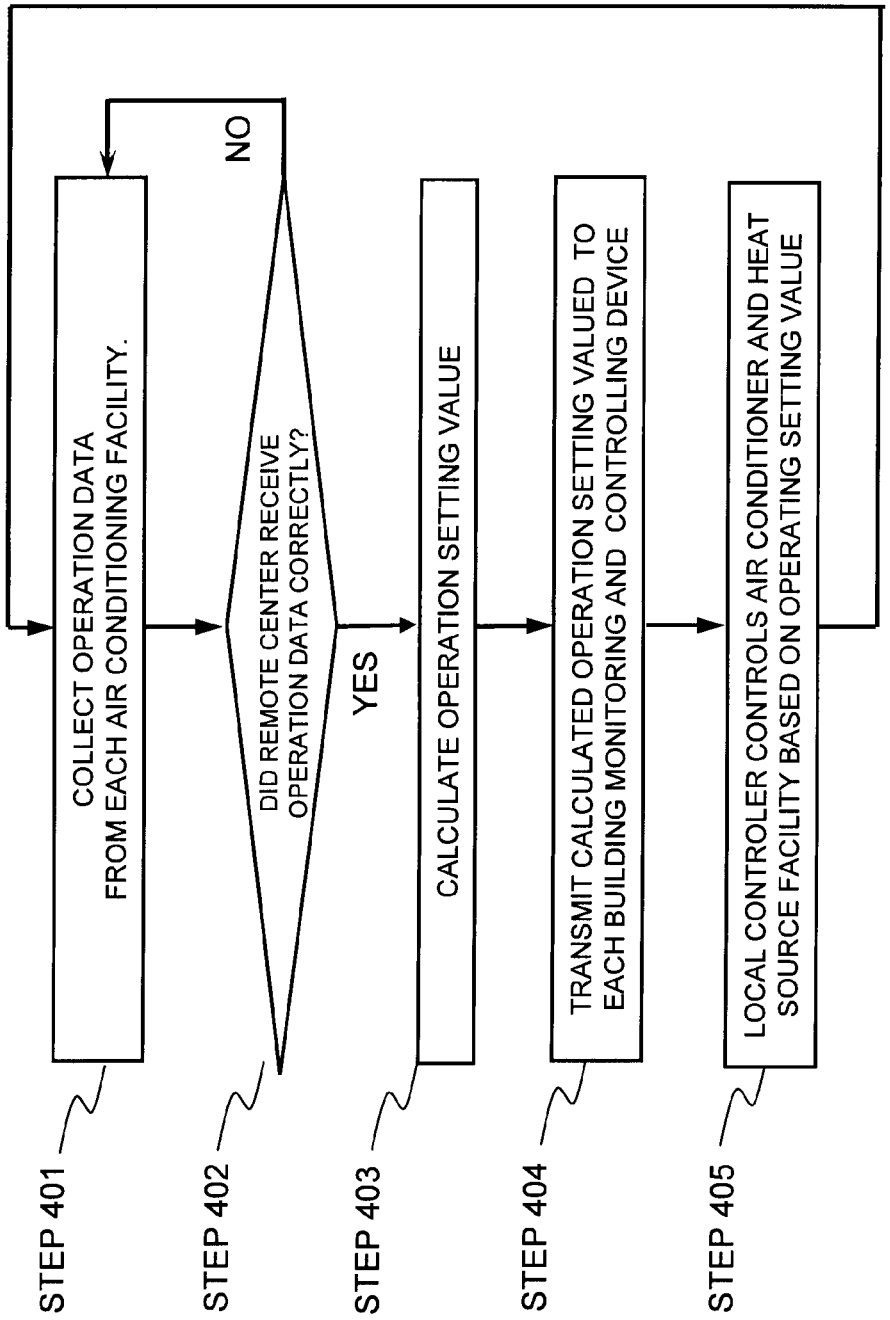
FIG. 2 is a flowchart showing an operation of the air conditioning control system according to the embodiment.

FIG. 2 shows an operation of the air conditioning control system according to the embodiment.

The remote controller 11 in the remote center 10 collects the operation data on the air conditioning facilities 27a, . . . , 27n at a constant frequency from the building monitoring and controlling devices 25a, . . . , 25n of the buildings 20a, . . . , 20n (Step 401). The operation data are needed to calculate the "PMV value" in real time. The operation data are temperature, humidity and outdoor temperature as described above.

The remote controller 11 checks if the collected operation data are normally received (Step 402). If the operation data is not normally received (Step 402-NO), the remote controller 11 collects the operation data again. When the operation data are collected again, the number of times at which the data are collected may be limited to the preset number of times.

The remote controller 11 calculates the "PMV value" for each of the buildings 20a, . . . , 20n based on the operation data transmitted from the building monitoring and controlling devices 25a, . . . , 25n, preset values to calculate the "PMV value," and the like. In addition, the remote controller 11 calculates, from the calculated PMV value, the operation setting value to enable obtaining a predetermined PMV value (Step 403).

The predetermined "PMV value" is between −0.5 and +0.5, for example. Temperature and humidity which allow the PMV value to be within this range are calculated. The calculated temperature is referred to as the operation set temperature, and the calculated humidity is referred to as the operation set humidity.

Further, if the energy consumption of the entire air conditioning system is requested to be minimized, the remote controller 11 calculates, as the operation setting value, the "supply air temperature," the "heat-transfer-medium temperature," and the like which minimize the sum of the powers of the air conditioners 21a, . . . , 21n2 and heat source facilities 23a, . . . , 23n and the power consumption of the pumps which circulate the heat transfer medium.

The remote controller 11 transmits the operation setting value calculated for each of the buildings 20a, . . . , 20n to the corresponding one of the building monitoring and controlling devices 25a, . . . , 25n (Step 404). The number of transmissions between the remote controller 11 and the building monitoring and controlling devices 25a, . . . , 25n may be limited for the purpose of failure avoidance and the like.

The building monitoring and controlling device 25a receives the operation setting value transmitted from the remote controller 11. The operation setting value includes the operation set temperature and operation set humidity of the air conditioner 21a, the operation set heat-transfer-medium temperature of the heat source facilities 23a, and the like. The building monitoring and controlling device 25a transmits the operation setting value to the air conditioning facility 27a. Specifically, the building monitoring and controlling device 25a transmits the operation set temperature and the operation set humidity to the local air conditioning controller 22a, and transmits the operation set heat-transfer-medium temperature to the local heat source controller 24a. Accordingly, the local air conditioning controller 22a performs set value control and power control of the air conditioner 21a, and the local heat source controller 24a performs set value control and power control of the heat source facility 23a (Step 405).

Other building monitoring and controlling devices operate in the same manner as the building monitoring and controlling device 25a. For example, the building monitoring and controlling device 25n receives the operation setting value transmitted from the remote controller 11. Then the building monitoring and controlling device 25n transmits the operation setting value to the air conditioning facility 27n. Specifically, the building monitoring and controlling device 25n transmits the operation set temperature and the operation set humidity to the local air conditioning controllers 22n1, 22n2, and transmits the operation set heat-transfer-medium temperature to the local heat source controller 24n. Accordingly, the local air conditioning controller 22n1 performs set value control and power control of the air conditioner 21n1, the local air conditioning controller 22n2 performs set value control and power control of the air conditioner 21n2, and the local heat source controller 24n performs set value control and power control of the heat source facility 23n (Step 405).

After that, the operation of Step 401 to 405 is repeated in accordance with the surrounding environment which changes over time.

As described above, according to the embodiment, the remote controller collectively calculates the operation setting value for the air conditioning facility for each building. For this reason, the embodiment allows to reduce the number of units to calculate the operation setting values compared with the case where the units to calculate the operation setting values are provided in the buildings, respectively. In addition, according to the embodiment, the building monitoring and controlling device is provided in each building, whereby the air conditioning control system can be provided at a low cost compared with the case where the units to calculate the operation setting values are provided in the buildings, respectively. Hence, according to the embodiment, an air conditioning control system which enables reducing the introduction cost and the maintenance cost is obtained.

Therefore, according to the invention, an air conditioning control system which enables reducing the introduction cost and the maintenance cost can be provided.

While description has been given of an embodiment of the invention, the embodiment is presented as an example and is not intended to limit the scope of the invention. The embodiment, which is novel, is capable of being carried out in various other arrangements, and various omissions, replacements, or modifications, can be made without departing from the gist of the invention.

For example, a function of the building monitoring and controlling device may be added to one of the multiple local controllers (local air conditioning controller or local heat source controller).

What is claimed is:

1. An air conditioning control system comprising:
   a plurality of building monitoring and controlling devices installed in a plurality of buildings, wherein a plurality of air conditioning facilities are installed in the plurality of buildings, and each building monitoring and controlling device monitors and controls an air conditioning facility in a building in which the building monitoring and controlling device is installed; and
   a remote controller connected to the plurality of building monitoring and controlling devices through a communication network, wherein the remote controller:
      acquires operation data on an air conditioning facility from each of the plurality of building monitoring and controlling devices through the communication network;
      calculates an operation setting value for each conditioning facility based on the operation data; and
      transmits the operation setting value for the air conditioning facility, through the communication network, to the building monitoring and controlling device which monitors and controls the air conditioning facility corresponding to the operation setting value;
   wherein each of the building monitoring and controlling devices
      a) receives the operation data on the air conditioning facility from the air conditioning facility installed in the building in which the building monitoring and controlling device itself is installed,
      b) transmits the received operation data to the remote controller through the communication network,
      c) receives the operation setting value for the air conditioning facility from the remote controller through the communication network, and
      d) controls the air conditioning facility by transmitting the received operation setting value to the air conditioning facility;
   wherein each of the building monitoring and controlling devices periodically receives the operation data on the air conditioning facility from the air conditioning facility, and periodically transmits the received operation data to the remote controller, and
   wherein the remote controller periodically transmits the operation setting value for the air conditioning facility to the building monitoring and controlling device which monitors and controls the air conditioning facility corresponding to the operation setting value.

2. An air conditioning control system comprising:
   a plurality of building monitoring and controlling devices installed in a plurality of buildings, wherein a plurality of air conditioning facilities are installed in the plurality of buildings, and each building monitoring and controlling device monitors and controls an air conditioning facility in a building in which the building monitoring and controlling device is installed; and
   a remote controller connected to the plurality of building monitoring and controlling devices through a communication network, wherein the remote controller:
      acquires operation data on an air conditioning facility from each of the plurality of building monitoring and controlling devices through the communication network,
      calculates an operation setting value for each conditioning facility based on the operation data; and
      transmits the operation setting value for the air conditioning facility, through the communication network, to the building monitoring and controlling device which monitors and controls the air conditioning facility corresponding to the operation setting value;
   wherein the air conditioning facility includes an air conditioner and a local air conditioning controller for controlling the air conditioner, and
   wherein each of the building monitoring and controlling devices:
      acquires operation data on the air conditioner from the local air conditioning controller,
      transmits the acquired operation data to the remote controller, and
      transmits the received operation setting valve from the remote controller to the local air conditioning controller; wherein the operation setting value includes an operation set temperature and an operation set humidity for the air conditioning facility, and further wherein each of the building monitoring and controlling devices transmits the operation set temperature and the operation set humidity to the local air conditioning controller.

3. The air conditioning control system according to claim 2, wherein
   the operation data on the air conditioning facility includes temperature, humidity and outdoor temperature, and
   the remote controller calculates the operation setting value for the air conditioning facility using a comfort index PMV.

4. The air conditioning control system according to claim 3, wherein the air conditioning facility further includes a heat source facility and a local heat source controller for controlling the heat source facility.

5. The air conditioning control system according to claim 4, wherein
   the remote controller determines an operation setting value which minimize energy consumption of the air conditioning facility, and calculates, as the operation setting value, the operation set temperature, the operation set humidity, an operation set heat-transfer-medium temperature, and a supply air temperature of the air conditioning facility, and
   the building monitoring and controlling device further transmits the supply air temperature to the local air conditioning controller, and also transmits the operation set heat-transfer-medium temperature to the local heat source controller.

6. The air conditioning control system according to claim 1, wherein
   the air conditioning facility includes a plurality of air conditioners and a plurality of local air conditioning controllers for controlling the plurality of air conditioners,
   the building monitoring and controlling device acquires operation data on the plurality of air conditioners from the plurality of local air conditioning controllers, and transmits the acquired operation data on the plurality of air conditioners to the remote controller, and
   the remote controller calculates the operation setting value for each of the air conditioners, and transmits the calculated operation setting value for each of the air conditioners to the building monitoring and controlling device monitoring and controlling the air conditioning facility corresponding to the operation setting value for each of the air conditioners.

7. An air conditioning control system comprising:
a plurality of building monitoring and controlling devices monitoring and controlling device which is used for monitoring and controlling an air conditioning facility; and
a remote controller which manages the plurality of building monitoring and controlling devices through a communication network;
wherein the remote controller:
   acquires operation data on an air conditioning facility from each building monitoring and controlling device;
   calculates an operation setting value for the air conditioning facility based on the operation data, and
   transmits the operation setting value periodically to the building monitoring and controlling device;
wherein each budding monitoring and controlling device:
a) receives the operation data on the air conditioning facility periodically from the air conditioning facility;
b) transmits the received operation data periodically to the remote controller
c) receives the operation setting value for the air conditioning facility for the remote controller, and
d) transmits the received operation setting value to the air conditioning facility.

8. An air conditioning control system comprising:
a plurality of building controlling devices, wherein each building controlling device which is used for controlling an air conditioning facility; and
a remote controller which manages the plurality of building controlling devices through a communication network;
wherein the remote controller:
   acquires operation data on an air conditioning facility from each building controlling device,
   calculates an operation setting value for the air conditioning facility based on the operation data, and
   transmits the operating setting value periodically to the building controlling device;
wherein each building controlling device:
a) receives the operation data on the air conditioning facility periodically from the air conditioning facility;
b) transmits the received operation data periodically to the remote controller;
c) receives the operation setting value for the air conditioning facility from the remote controller; and
d) transmits the received operation setting value to the air conditioning facility.

\* \* \* \* \*